Oct. 27, 1964    N. C. CRAWFORD    3,154,304
BOX GAUGE TOOL
Filed Aug. 1, 1962

INVENTOR
Nelson C. Crawford
BY
Hovey, Schmidt, Johnson & Hovey
ATTORNEYS.

United States Patent Office 3,154,304
Patented Oct. 27, 1964

3,154,304
BOX GAUGE TOOL
Nelson C. Crawford, 31 S. 5th St., Columbia, Mo.
Filed Aug. 1, 1962, Ser. No. 214,116
12 Claims. (Cl. 269—47)

This invention relates to positioning apparatus, and more particularly, to a tool for accurately positioning an electrical outlet box to an upright wall stud to accommodate wallboard subsequently affixed to the wall stud.

In erecting a wall using upright wall studs and wallboard affixed to the studs, a problem arising in securing electrical outlet boxes to the wall studs prior to the placement of the wall board thereon. To properly position the boxes on the studs the outer or open ends of the boxes should be spaced predetermined distances from the end faces of the studs, depending upon the thickness of wallboard to be used so that the open ends of the boxes will be substantially flush, or nearly so, with the outer surface of the wallboard.

Heretofore it has been necessary to affix the boxes to the studs after a number of measurements have been taken. Such an operation is time-consuming and sometimes quite inaccurate. The present invention provides a tool which may be utilized for positioning an electrical outlet box against a wall stud so that the outer open end of the box will be properly located with respect to the outer surface of a wallboard to be later secured to the end face of the wall stud. In addition, the present invention also provides a support for holding the electrical outlet box in a fixed position so that the box may be more readily affixed to the wall stud than was heretofore possible.

It is, therefore, the primary object of the present invention to provide a tool for selectively positioning an electrical outlet box relative to a wall stud so that the outer open end of the box will be spaced from the proximal end face of the wall stud to accommodate wallboard later to be affixed to the stud with the open end of the box being substantially flush with the outer surface of the wallboard.

A further object of the present invention is the provision of a tool of the aforesaid character which supports the box as the latter is selectively positioned relative to the wall stud, whereby the box may be more readily secured to the wall stud by conventional means than was heretofore possible.

Still another object of the present invention is the provision of means on the tool of the type described for releasably mounting the box thereon whereby the tool may be readily removed from the box after the latter has been affixed to the wall stud.

Other objects of this invention will become apparent as the following specification progresses, reference being had to the accompanying drawing, wherein.

The present invention comprises a tool for selectively positioning an electrical outlet box against one side of an upright wall stud so that the open end of the box is spaced outwardly from the wall stud a predetermined distance corresponding to the thickness of the wallboard which is later to be affixed to the wall stud. Thus, the outer end of the box may be disposed in a position so that the same is substantially flush with the outer surface of the wallboard.

The present invention includes a plate having a recess therein for receiving a portion of the box and resilient means thereon extending outwardly therefrom for gripping the box and thereby supporting the latter to the plate. In addition, a wall stud-engaging element is adjustably mounted on the plate and extends outwardly therefrom for engaging the proximal end face of the wall stud when the box is caused to engage an adjacent side of the wall stud. Releasable fastening means maintains the element in any one of a number of fixed locations on the plate so that the open end of the box may be moved toward and away from the proximal end face to thereby accommodate wallboards having thicknesses varying over a predetermined range.

Figure 1:
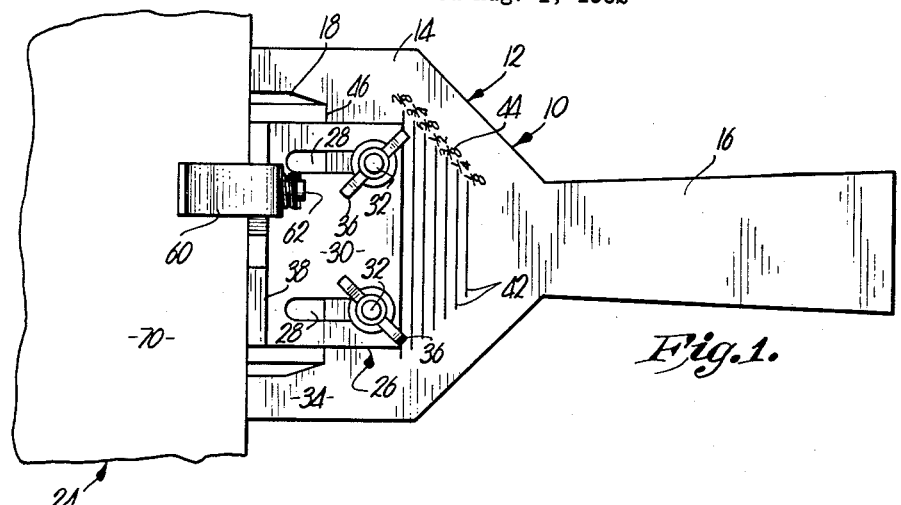
FIGURE 1 is a side elevational view of the tool of the present invention and illustrating the use thereof for positioning an electrical outlet box relative to an upright wall stud.

The tool which forms the subject of the present invention is broadly denoted by the numeral 10 and includes a support 12 in the nature of a flat plate 14, having a handle portion 16 extending outwardly therefrom, as is clear in FIG. 1. Plate 14 is provided with a recess 18 therein at the extremity thereof opposite to the extremity affixed to handle 16. Recess 18 defines a pair of extensions 20 which are adapted to engage one side 22 of an upright wall stud 24 forming a part of a wall of a building or the like.

An L-shaped, wall-engaging element 26 is provided with a pair of substantially parallel slots 28 in one section 30 thereof for receiving screws 32 carried by plate 14 and extending outwardly from one surface 34 of the latter. Wing nuts 36 coupled with screws 32 releasably secure section 30 to plate 14 in any one of a number of fixed locations, depending upon the positions of screws 32 and slots 28.

Figure 2:
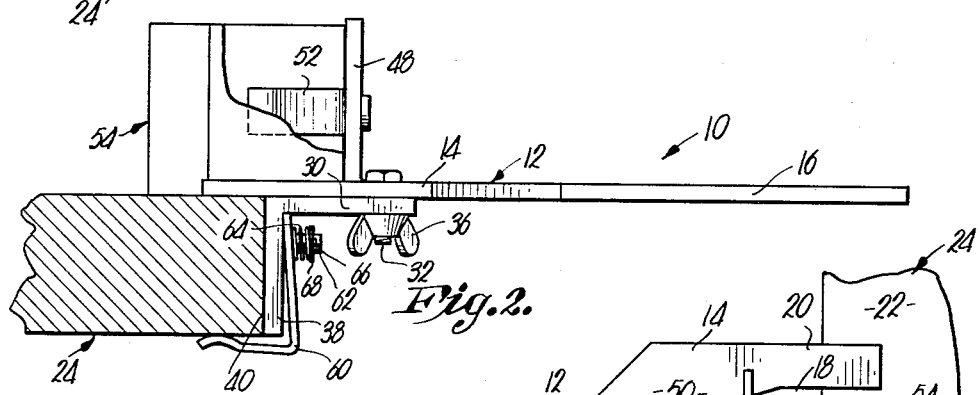
FIG. 2 is a top plan view of the tool illustrated in FIG. 1 and showing the relative positions of wall stud and electrical outlet box with the open end of the latter in predetermined spaced relationship to the proximal end face of the wall stud, parts being broken away to illustrate details of construction.

Element 26 is provided with a section 38 integral with and perpendicular to section 30, as is clear in FIG. 2. Section 38 is adapted to engage an end face 40 of wall stud 24 as extensions 20 engage side 22.

As shown in FIG. 1, plate 14 is provided with a number of lines 42 thereon having indicia 44 at the ends thereof representing the intervals by which section 38 is spaced from edge 46 of plate 14 formed by recess 18.

Figure 3:
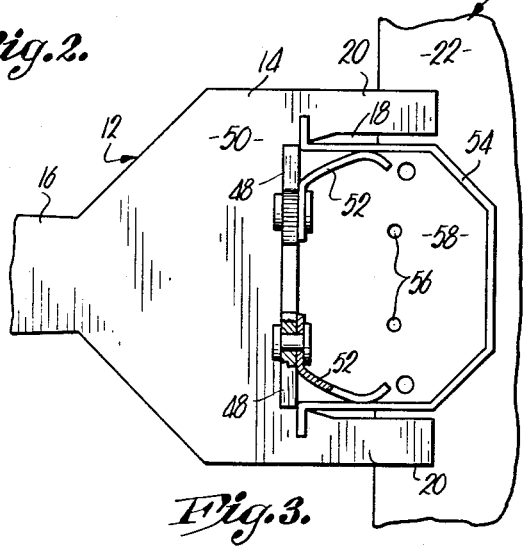
FIG. 3 is a fragmentary, elevational view of the side of the tool opposite to the side illustrated in FIG. 1.

A pair of projections 48 extend outwardly from the opposite surface 50 of plate 14. A resilient spring clip 52 is rigid to each projection 48 as is clear in FIG. 3, clips 52 extending substantially in the same direction as extensions 20 but away from each other. Clips 52 are adapted to be received within the open end of an electrical outlet box 54 for engaging opposed inner surfaces of box 54 in the manner set forth in FIG. 3. Manifestly, the box-engaging portions of clips 52 are normally disposed a distance apart greater than the distance between the surfaces which clips 52 engage. Thus, when box 54 is disposed over clips 52, the latter are biased in opposed directions to thereby grip box 54 and releasably secure the same to plate 14 with a portion of box 54 within recess 18.

It can thus be seen that by selectively positioning section 30 of element 26 on plate 14, the open end of box 54 will be moved closer to or further from end face 40 of wall stud 24.

In use, box 54 is disposed over clips 52 and thereby held to plate 14. Element 26 is adjusted relative to plate 14 by manipulating nuts 36 so that section 30 is aligned with any one of the lines 42 corresponding to the thickness of the wallboard to be later affixed to wall stud 24. In this respect, indicia 44 represent the thicknesses of the wallboards which can be accommodated with the use of tool 10. Tool 10 is then moved into engagement with wall stud 24 with extensions 20 engaging side 22, and section 38 engaging end face 40 in the manner illustrated in FIG. 2. Box 54 is thus correctly positioned so that the outer open end of box 54 will be flush with the outer surface of the wallboard when the latter is subsequently affixed to wall stud 24.

Tool 10 may be utilized for maintaining box 54 in a fixed position so that nails or the like may be driven into wall stud 24 through holes 56 in the proximal side wall 58 of box 54. The opposite side wall of box 54, which is normally removable, is removed to facilitate the use of a tool for driving nails into stud 24 through holes 56.

To maintain tool 10 on stud 24 as nails are driven into holes 56, an L-shaped clip member 60 is carried by section 38 by means of a spindle 62 rigid to and extending outwardly from section 38. Member 60 is provided with a hole of slightly greater diameter than spindle 62, and a coil spring 64 surrounds spindle 62 and normally biases member 60 against section 38. A key 66 retains a washer 68 and thereby spring 64 on spindle 62. Member 60 also engages the opposite face 70 of stud 24 so that tool 10 effectively grips wall stud 24 to facilitate the interconnection of box 54 to side 22.

After box 54 has been secured to stud 24, tool 10 is withdrawn and clips 52 move out of box 54 and section 38 moves away from end face 40. The wallboard may then be affixed to wall stud 24.

Figure 4:
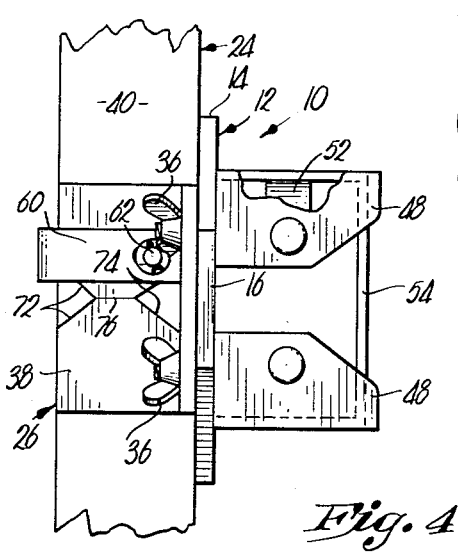
FIG. 4 is an end elevational view of the tool looking in the direction of the wall stud and illustrating the side-by-side relationship of the wall stud and electrical outlet box.

As shown in FIG. 4, section 38 is preferably notched along a pair of longitudinal edges thereof to form a first pair of divergent edges 72, and a second pair of relatively divergent edges 74, edges 72 and 74 all terminating on a line 76 which projects into recess 18 substantially at the mid-point thereof. Thus, by initially marking end face 40, box 54 may be located on wall stud 24 so that the mid-point of box 54 is coincident with line 76.

Having thus described the invention, what is claimed as new and desired to be secured by Letters Patent is:

1. A tool for positioning an open end member against one side of a wall stud with said open end being in predetermined spaced relationship to an end face of said wall stud, said tool comprising:
   a support adapted for engaging said one side of the wall stud;
   means carried by said support for releasably mounting said member thereon, said support having a member-receiving recess therein disposed to permit said member to be positioned against and in engagement with said one side of the wall stud as the latter is engaged by said support; and
   means adjustably mounted on said support and engageable with said end face of the wall stud for selectively positioning said support relative to said wall stud, whereby said open end is spaced from said wall stud in positions corresponding to the selective positions of said support.

2. A tool for positioning an open end, electrical outlet box against one side of a wall stud with the open end thereof in predetermined spaced relationship to an end face of said wall stud, said tool comprising:
   an elongated support having a pair of opposed surfaces and adapted to be disposed in outwardly extending relationship to said end face of the wall stud with one of said surfaces in engagement with said one side of the wall stud;
   means carried by said support intermediate the ends thereof and extending outwardly from the other surface thereof in a position permitting said box to be secured to said one side of the wall stud for supporting said box thereon; a wall stud-engaging element; and
   means for adjustably mounting said element on said support intermediate the ends thereof in outwardly extending relationship to said one surface, said element being disposed for engaging said one face to selectively position said support and thereby said box relative to said side, whereby said open end is selectively positioned relative to said end face of the wall stud.

3. A tool as set forth in claim 2, wherein said element is provided with a slot therein, and including fastening means carried by said support and extending through said slot for releasably securing said element to said support, and indicia-forming means carried by said support for indicating the position of said element thereon.

4. A tool as set forth in claim 2, wherein said box-supporting means includes a projection secured to said support and resilient means engageable with the box for releasably securing said box to said projection.

5. A tool as set forth in claim 4, wherein said resilient means includes a pair of spring clips extending outwardly from the projection in opposed directions, said clips being receivable within the open end of the box and engageable with opposed, inner surfaces thereof.

6. A tool as set forth in claim 2, wherein is included means carried by said element and cooperable with said one surface of the support for gripping said wall stud to releasably maintain said element and thereby said support in a fixed position relative to said wall stud.

7. A tool as set forth in claim 6, wherein said gripping means includes a clip engageable with the opposite side of said wall stud, and means connecting said clip to said element and biasing the clip toward said opposite side.

8. A tool as set forth in claim 2, wherein said support comprises a plate having a recess therein for receiving a side of said box, said recess being disposed to permit the side of said box to be positioned against and in engagement with said one side of said wall stud.

9. A tool as set forth in claim 7, said clip being L-shaped and connected adjacent one end thereof to said element, said connecting and biasing means including a spindle extending outwardly from the element and a spring coupled with said spindle.

10. A tool as set forth in claim 9, said clip being provided with a hole therein adjacent said one end thereof, said spindle being loosely received within said hole and provided with a stop at the outer end thereof, said spring being in surrounding relationship to said spindle and in engagement with said clip and said stop.

11. A tool as set forth in claim 10, wherein said gripping means includes a clip movably mounted on said element, and means biasing the clip in a direction to cause said clip to engage the opposite side of said wall stud.

12. A tool for positioning an open end member against one side of a wall stud with said open end being in predetermined spaced relationship to an end face of said wall stud, said tool comprising:
   structure engageable with said one side of the wall stud and having means thereon for supporting said member in a position permitting the latter to be secured to said one side of the wall stud;
   a wall stud-engaging element;
   means releasably securing said element to said structure in any one of a number of fixed locations thereon to dispose the member in a position with the open end thereof in said predetermined spaced relationship to said end face; and means carried by said element and cooperable with said structure for gripping said wall stud to releasably maintain said element and thereby said structure in a fixed position relative to said wall stud.

References Cited in the file of this patent

UNITED STATES PATENTS

| | | |
|---|---|---|
| 2,919,913 | Phair | Jan. 5, 1960 |
| 2,956,798 | Briggs | Oct. 18, 1960 |
| 2,962,281 | Hodgson | Nov. 29, 1960 |
| 2,965,972 | Hunt | Dec. 27, 1960 |
| 2,990,172 | Gianotta | June 27, 1961 |